United States Patent [11] 3,610,268

| [72] | Inventor | Armais Arutunoff<br>Bartlesville, Okla. |
|---|---|---|
| [21] | Appl. No. | 1,225 |
| [22] | Filed | Jan. 7, 1970 |
| [45] | Patented | Oct. 5, 1971 |
| [73] | Assignee | Reda Pump Company<br>Bartlesville, Okla. |

[54] LIQUID CHECK VALVE WITH CONTROLLED GAS VENT
4 Claims, 4 Drawing Figs.

[52] U.S. Cl.................................................. 137/119,
137/583, 137/627.5, 137/614.18, 137/513
[51] Int. Cl.......................................................... F16k 45/00
[50] Field of Search............................................ 137/119,
583, 512.3, 512.4, 513, 625.24, 627.5, 614.18

[56] References Cited
UNITED STATES PATENTS

| 2,744,469 | 5/1956 | Schaefer.......................... | 137/513 |
| 3,358,705 | 12/1967 | Krechel.......................... | 137/119 |
| 3,439,697 | 4/1969 | Blanchette..................... | 137/119 |
| 3,446,233 | 5/1969 | Herold............................ | 137/119 |

*Primary Examiner*—Laverne D. Geiger
*Assistant Examiner*—William A. Wright
*Attorney*—G. Mallet Prevost ABSTRACT: A gas venting check valve assembly for connection between the discharge end of a submergible, centrifugal pump in an oil well and the inlet end of a delivery tubing, having a valve member which normally opens under the influence of the oil being pumped and seats under the weight of the column of pumped oil above the pump when the pump is stopped or when the gaseous content of the fluid being pumped is sufficient to prevent the maintenance of the necessary pressure to support the column of pumped oil. The valve housing is provided with a gas vent passageway below the valve seat which is closed by the valve proper when the latter is in open position and is opened to permit the venting of gas when the valve proper is seated.

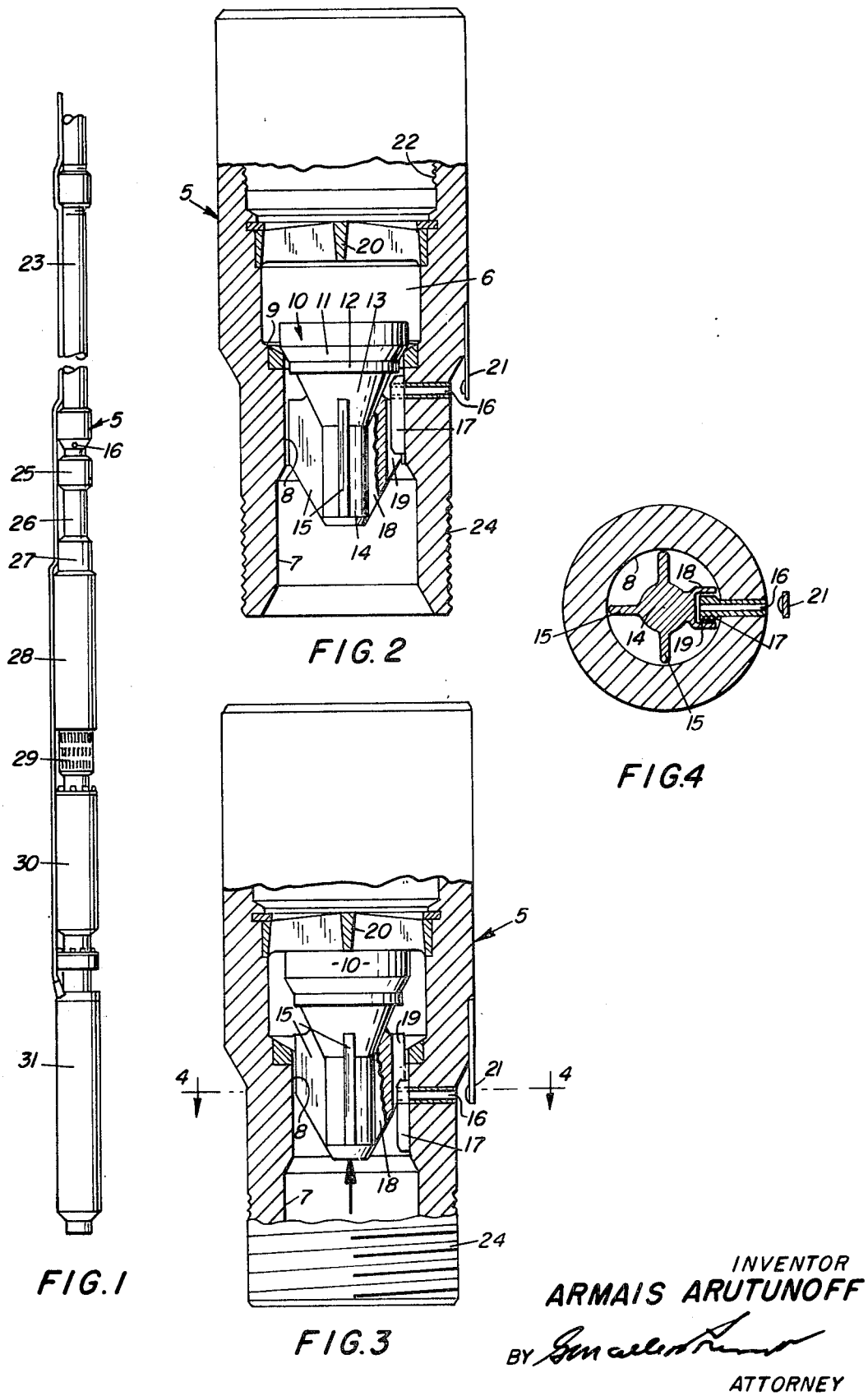

3,610,268

LIQUID CHECK VALVE WITH CONTROLLED GAS VENT

BACKGROUND OF THE INVENTION

With conventional equipment, when pumping oil from deep oil wells by use of electrical, submergible, centrifugal pumps, whenever the pump intake becomes surrounded by gas or gaseous liquid, the steady delivery of oil to the surface is interrupted. Although running at full speed, when the pump is only partially filled with liquid, it becomes unable to develop sufficient pressure to overcome the weight of the column of liquid already pumped into the delivery tube, and pumping has to be stopped to avoid overheating the motor. The motor has to be disconnected from the line for as long a period of time as necessary for a column of liquid to build up to such a height around the pump intake that the latter becomes once again surrounded by liquid, and a sufficient head of liquid is accumulated in the well to push the liquid into the pump and to justify another starting of the motor.

It is therefore the primary object of the present invention to provide a check valve assembly for the discharge end of the pump which will prevent gas locking of the pump and the elimination of the necessity to disconnect the motor because of gas interference.

Another object of the invention is to provide a check valve which, when the valve plug is seated because of insufficient liquid pressure or a predominance of gas in the fluid being pumped, automatically opens a vent to permit the escape of gaseous fluid entering the pump intake, and when the valve plug is unseated under the influence of liquid being pumped, the valve plug automatically closes the gas vent.

A further object of the invention is to provide a check valve wherein the valve plug, when seated, opens a gas vent, and, when unseated, closes the gas vent.

With the above and other objects in view which will appear as the description proceeds, the invention consists in the novel features herein set forth, illustrated in the accompanying drawings, and more particularly pointed out in the appended claims.

THE DRAWINGS

Referring to the drawings in which numerals of like character designate similar parts throughout the several views:

1 is a schematic elevational view showing the location of the check valve of the present invention, with respect to the delivery tubing and string of pumping equipment;

FIG. 2 is a sectional view of the check valve assembly showing the valve plug in seated position and the gas vent opened;

FIG. 3 is a similar view showing the valve plug unseated and the gas vent closed; and FIG. 4 is a transverse sectional view taken on line 4—4 of FIG. 3 showing the construction of the vent control.

DETAILED DESCRIPTION

Referring to FIGS. 2 and 3, it will be seen that the check valve assembly comprises a substantially cylindrical valve housing 5, the interior of which is provided with an upper chamber 6 and a lower chamber 7 communicating through a passageway 8. The upper end of the passageway is bounded by a valve seat 9 with which a valve plug 10 coacts to open or close the passageway 8 extending between the two chambers.

The valve plug 10, which is freely floating in passageway 8, is provided with a reduced seat-engaging area 11 which is preferably substantially frustoconical in shape and terminates in an annular plunger 12 of a diameter to fit within the passageway 8 with a sliding clearance. Beneath the plunger 12, the plug continues to converge as at 13 and terminates in a substantially cylindrical portion or stem 14. A series of radiating fins 15 are provided on the cylindrical stem 14, which are arranged in sliding clearance with the passageway 8 to maintain the vertical positioning of the plug 10 in the passageway.

As previously pointed out, one of the important features of the present invention is to vent gas or gaseous fluid when the valve plug has become seated because of inadequate pressure of the fluid discharged from the pump. To accomplish this venting, a vent tube 16 is pressed into a suitable opening in the portion of the housing 5 which forms the wall of the passageway 8, at a point below the valve seat 9. This vent tube 16 extends into the passageway 8 and has pressed on its inner end, a vertically disposed guide member 17 having a vent opening therein and which embraces the inner wall of the passageway 8. A specially constructed fin 18 replaces the regular fin 15 adjacent the guide member 17, and as best seen in FIG. 4, this special fin is longitudinally recessed along its outer radial extremity as at 19, to slidably receive the guide member 17 during the vertical movement up or down of the valve plug 10.

As seen in FIG. 3 of the drawings, when the valve plug is in its normal upward position away from the seat 9, the recessed portion 19 of the special fin 18 closes the inner end of the vent tube 16, so as to prevent the escape of any fluid through the vent. However, when the valve plug is in its lowermost or seated position, as shown in FIG. 2, the upper extremity of the special fin 18 clears the inner end of the vent tube 16 and opens the same, so that when the plug 10 is closed, gas is vented from the lower chamber 7 through the vent tube 16.

A suitable stop member or abutment 20 is provided in the upper chamber 6, so as to limit the upward movement of the valve plug 10 when liquid is passing normally through the check valve housing. Also, baffle 21 is provided on the outer wall of the housing 5, adjacent the discharge end of the vent tube 16, to break the stream of discharging gaseous fluid as it leaves the vent tube.

As shown in FIG. 1 of the drawings, the check valve housing 5 is located between the discharge end 27 of the pump 28 and the lower end of a string of delivery tubing 23. Ordinarily, a coupling 25 and short pipe 26 are used to effect the connection with the discharge end of the pump. The intake of the pump unit is arranged at its lower end as at 29, and a conventional motor protector 30 is connected between the pump and the motor 31 at the lower end of the string. The basic installation with which the check valve of the present invention is employed is conventional equipment and requires no further description.

In operation, the normal flow of liquid oil from the pump 28 to the delivery tubing 23 is under sufficient pressure to maintain the valve plug 10 in the elevated position shown in FIG. 3. Here, it will be seen that the vent 16 is closed at its inner end by the special fin 18 at its groove 19. However, should a condition arise where the intake 29 of the pump 28 becomes surrounded by gas or gaseous liquid, the pump, being only partially filled with liquid, becomes unable to develop sufficient pressure to overcome the weight of the column of liquid in the delivery tube 23. When this occurs, the valve plug 10 drops under the weight of the column of liquid onto the seat 9 at the discharge end of the passageway 8, thus closing the passageway. In the lowermost position of the valve plug 10, as shown in FIG. 2, the special fin 18 drops below the inlet end of the vent tube 16 and thereby opens the same to the lower chamber 7. As a result, the continued operation of the pump 28 simply forces gas or gaseous liquid through the vent into the well until a sufficient head of liquid is accumulated in the well around the pump inlet 29 to overcome the weight of the column of liquid in tube 23, and open the valve plug 10, simultaneously closing the vent 16. The pumping then continues as long as the liquid condition exists around the pump intake.

Form the foregoing, it is believed that the invention may be readily understood by those skilled in the art without further description.

I claim:

1. A gas venting check valve assembly for connection between the discharge end of a submergible, centrifugal pump in an oil well, and the inlet end of an oil delivery tubing, said assembly comprising a housing having upper and lower internal chambers connected by a fluid passageway, a valve seat in said passageway, a free floating valve plug coacting with said seat to isolate said chambers, a gas vent from a point in said passageway below said valve seat to the exterior of said housing, said valve plug being shiftable from said seat by the pump pressure on liquid flowing through said passageway to said delivery tubing, and shiftable into seat engagement when the weight of the column of oil in said delivery tubing offsets said pump pressure, closing said passageway, the lower portion of said valve plug being reduced in diameter and carrying a series of radially extending centering fins, slidably engaging the walls of said passageway, one of said fins being arranged in sliding engagement with said gas vent for closing said vent when the valve plug is in unseated open position and for opening said vent when said valve plug is in seated closed position, whereby, when the gaseous content of the fluid entering said pump prevents the development of sufficient pressure to support the weight of the column of liquid already pumped, said plug drops to seated position, closing said passageway and opening said vent.

2. A check valve as claimed in claim 1, wherein said gas vent comprises a vent tube extending through said housing and carrying at its inner end within said passageway, a vertical guide member, means carried by said valve plug slidably engaging said guide member for controlling the opening and closing of said vent.

3. Apparatus as claimed in claim 1, including a baffle on the exterior of said housing adjacent the outlet of said vent to break the stream of discharging gaseous fluid as it leaves the vent tube.

4. Apparatus as claimed in claim 2, wherein said vent engaging fin is longitudinally recessed to slidably receive said guide member upon vertical movement up or down of said valve plug.